(12) United States Patent
Hsu et al.

(10) Patent No.: US 10,601,292 B2
(45) Date of Patent: Mar. 24, 2020

(54) CO-CONSTRUCTED POWER GENERATION DEVICE

(71) Applicant: WISTRON CORP., New Taipei (TW)

(72) Inventors: Wen Chieh Hsu, New Taipei (TW); Tai-Shen Yang, New Taipei (TW); Yueh-Chou Sung, New Taipei (TW)

(73) Assignee: WISTRON CORP., New Taipei (TW)

( * ) Notice: Subject to any disclaimer, the term of this patent is extended or adjusted under 35 U.S.C. 154(b) by 95 days.

(21) Appl. No.: 15/901,586

(22) Filed: Feb. 21, 2018

(65) Prior Publication Data

US 2019/0181738 A1 Jun. 13, 2019

(30) Foreign Application Priority Data

Dec. 13, 2017 (TW) .............................. 106143768 A

(51) Int. Cl.
| | |
|---|---|
| *H02K 7/06* | (2006.01) |
| *H02K 7/18* | (2006.01) |
| *H02K 35/00* | (2006.01) |
| *H02K 35/02* | (2006.01) |
| *F03G 7/08* | (2006.01) |

(52) U.S. Cl.
CPC .............. *H02K 35/02* (2013.01); *F03G 7/08* (2013.01); *H02K 7/06* (2013.01); *H02K 7/1861* (2013.01); *H02K 7/1876* (2013.01); *H02K 35/00* (2013.01)

(58) Field of Classification Search
CPC .... H02K 35/02; H02K 7/1876; H02K 7/1861; H02K 7/06; H02K 35/00; F03G 7/08
USPC .................................................. 310/12.14, 17
See application file for complete search history.

(56) References Cited

U.S. PATENT DOCUMENTS

| | | | |
|---|---|---|---|
| 5,975,714 A | 11/1999 | Vetorino et al. | |
| 7,168,393 B2 | 1/2007 | Bogdahn et al. | |
| 7,538,445 B2 | 5/2009 | Kornbluh et al. | |
| 8,030,903 B2 * | 10/2011 | Matsubara | F03G 7/08 320/166 |
| 2007/0290556 A1 * | 12/2007 | Hochhalter | H02K 7/06 310/12.14 |
| 2008/0296984 A1 * | 12/2008 | Honma | H02K 35/02 310/17 |
| 2009/0085530 A1 * | 4/2009 | Matsubara | F03G 7/08 320/166 |
| 2011/0254385 A1 * | 10/2011 | Makino | H02K 41/03 310/12.14 |
| 2012/0139262 A1 * | 6/2012 | Begley | F03G 7/08 290/1 R |

(Continued)

FOREIGN PATENT DOCUMENTS

| | | |
|---|---|---|
| CN | 205792025 U | 12/2016 |
| WO | 2007/121382 A2 | 10/2007 |

OTHER PUBLICATIONS

TW Office Action dated Dec. 3, 2018 in application No. 106143768.

(Continued)

*Primary Examiner* — John K Kim
(74) *Attorney, Agent, or Firm* — Maschoff Brennan

(57) ABSTRACT

A co-constructed power generation device comprises a shell member, a first power generation group and a second power generation group, wherein the first power generation group is disposed in the shell member and generates shake-induced power, and the second power generation group is disposed in the shell member and generates rotation-induced power.

6 Claims, 11 Drawing Sheets

(56) References Cited

U.S. PATENT DOCUMENTS

2014/0353060 A1* 12/2014 Stansbury, III ........ B60K 25/10
                                                    180/165
2015/0090545 A1*  4/2015 Zuo ...................... B60G 17/06
                                                    188/267
2019/0181738 A1*  6/2019 Hsu ........................... F03G 7/08

OTHER PUBLICATIONS

European search report for corresponding application No. EP 18158149.7, dated Aug. 21, 2018.

* cited by examiner

CO-CONSTRUCTED POWER GENERATION DEVICE

CROSS-REFERENCE TO RELATED APPLICATIONS

This non-provisional application claims priority under 35 U.S.C. § 119(a) on Patent Application No(s). 106143768 filed in Taiwan, R.O.C. on Dec. 13, 2017, the entire contents of which are hereby incorporated by reference.

BACKGROUND

Technical Field

This disclosure relates to a power generation device, and more particularly to a co-constructed power generation device.

Related Art

The principle of magnetoelectricity is that when a conductor cuts magnetic field lines, electromagnetic induction phenomenon occurs on the conductor so as to generate an induced current. Generally, the mechanisms of magnetoelectricity include rotation-induced power generation and shake-induced power generation. The device performing rotation-induced power generation is an electrical generator for example. The electrical generator rotates a coil/conductor between the two poles of a magnet, and the coil/conductor continuously cuts the magnetic field lines of the magnet when rotating, so that an induced current is generated. The device performing shake-induced power generation is a hand shake flashlight for example. In the hand shake flashlight, a magnet is disposed within a coil, and when an external force applied to the flashlight so as to make the magnet move relatively to the coil, the magnetic field lines of the magnet are cut by the coil so that an induced current is generated on the coil.

Various types of devices with rotary mechanisms in life, such as pet leash, bicycle, flywheel, fishing rod and reel and so on, are usually expected to have night lighting function. In addition to the rotation motion, these devices with rotary mechanisms must also be shaken by the user's force or other external forces when they are used. However, as aforementioned, the structures respectively based on the rotation-induced power generation and the shake-induced power generation are very different from each other. If these two types of structures for power generation are individually disposed in a device with a rotary mechanism, they must occupy a large space and greatly increase the weight of the device so that the usage convenience of the device is low.

SUMMARY

This disclosure provides a co-constructed power generation device comprising co-constructed power generation structure for generating electric power by shaking and by rotating.

According to one or more embodiments, a co-constructed power generation device comprises a shell member, a first power generation group and a second power generation group, wherein the first power generation group is disposed in the shell member and generates shake-induced power, and the second power generation group is disposed in the shell member and generates rotation-induced power.

According to one or more embodiments, a co-constructed power generation device comprises a shell member, a first power generation group and a second power generation group. The rotating member is rotatably disposed at the shell member, and the electromagnetic coil, the first power generation group and the second power generation group are disposed in the shell member. The first power generation group comprises a first magnetic body, a first elastic member and a second elastic member, with the first and second elastic members respectively connected with two ends of the first magnetic body and the first magnetic body suspended within the electromagnetic coil. The shake-induced power is generated from a relative movement between the first magnetic body and the electromagnetic coil, with the relative movement resulted from a shake of the first magnetic body caused by an external force applied to the shell member. The second power generation group comprises a connecting member connecting the rotating member and the shell member, and the electromagnetic coil is wrapped around the connecting member. When the rotating member rotates, the connecting member brings the first magnetic body to move relatively to the electromagnetic coil so as to generate the rotation-induced power.

According to one or more embodiments, a co-constructed power generation device comprises a shell member, a first power generation group and a second power generation group. The rotating member is rotatably disposed at the shell member, the electromagnetic coil is disposed at the shell member, and the first power generation group and the second power generation group are disposed in the shell member. The first power generation group comprises a first elastic member and a second elastic member, with the first and second elastic members respectively connected with two ends of the first magnetic body and the first magnetic body suspended within the electromagnetic coil. The shake-induced power is generated from relative movement between the first magnetic body and the electromagnetic coil, with the relative movement resulted from a shake of the first magnetic body caused by an external force applied to the shell member. The second power generation group comprises a connecting member connecting the rotating member and the first elastic member. When the rotating member rotates, the connecting member brings the first magnetic body to move relatively to the electromagnetic coil so as to generate the rotation-induced power.

According to one or more embodiments, a co-constructed power generation device comprises a shell member, a first power generation group and a second power generation group. The rotating member is rotatably disposed at the shell member, the electromagnetic coil is disposed at the rotating member, and the first power generation group and the second power generation group are disposed in the shell member. The first power generation group comprises a first elastic member and a second elastic member, with the first and second elastic members respectively connected with two ends of the first magnetic body and the first magnetic body suspended within the electromagnetic coil. The shake-induced power is generated from relative movement between the first magnetic body and the electromagnetic coil, with the relative movement resulted from a shake of the first magnetic body caused by an external force applied to the shell member. The second power generation group comprises a plurality of second magnetic bodies surrounding the electromagnetic coil. When the rotating member rotates, the electromagnetic coil moves relatively to the plurality of second magnetic bodies so as to generate the rotation-induced power.

According to one or more embodiments, a co-constructed power generation device comprises a shell member, a first power generation group and a second power generation group. The rotating member is rotatably disposed at a spindle of the shell member, the electromagnetic coil group is movably disposed in the spindle, and the first power generation group and the second power generation group are disposed in the shell member. The first power generation group is disposed in the electromagnetic coil group and comprises a first magnetic body, a first elastic member and a second elastic member, with the first and second elastic members respectively connected with two ends of the first magnetic body and the first magnetic body suspended within the electromagnetic coil group. The shake-induced power is generated from relative movement between the first magnetic body and the electromagnetic coil group, with the relative movement resulted from a shake of the first magnetic body caused by an external force applied to the shell member. The second power generation group comprises a connecting member and a second magnetic assembly, with the connecting member disposed at the rotating member and the second magnetic assembly disposed at two ends of the spindle. When the rotating member rotates, the connecting member bringing the electromagnetic coil group to move relatively to the second magnetic assembly so as to generate the rotation-induced power.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

The co-constructed power generation device provided in this disclosure comprises a shell member, a first power generation group and a second power generation group, wherein the first power generation group is disposed in the shell member and generates electric power by shaking (hereafter called "shake-induced power"), and the second power generation group is disposed in the shell member and generates electric power by rotating (hereafter called "rotation-induced power"). The co-constructed power generation device provided in this disclosure is applied to various types of devices each of which has a rotary mechanism, and more particularly to a device which has a rotary mechanism and mobility, such as pet leash, bicycle, flywheel, fishing rod and reel, or automatic retractor, but is not limited to these.

Figure 1A:
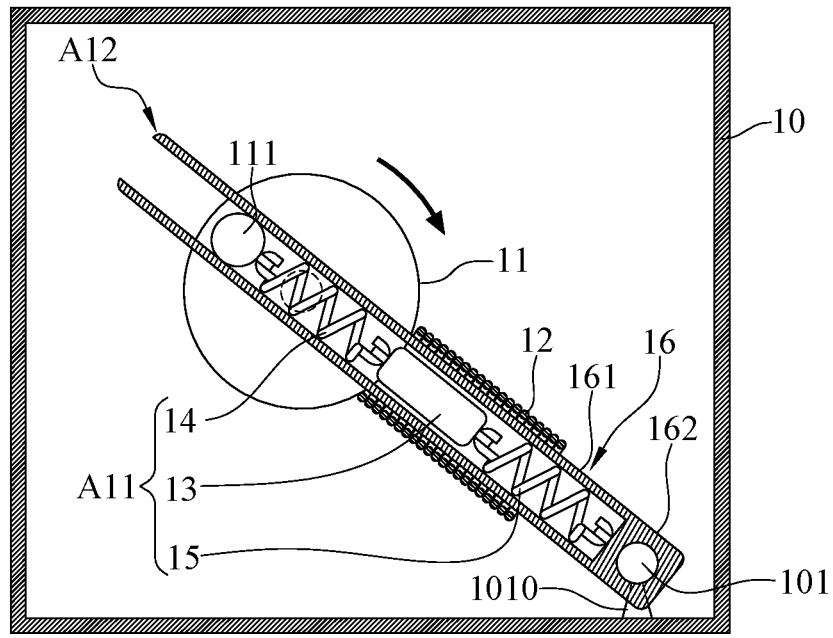
FIGS. 1A-1C are schematic diagrams of a co-constructed power generation device according to an embodiment of this disclosure.
Figure 1B:
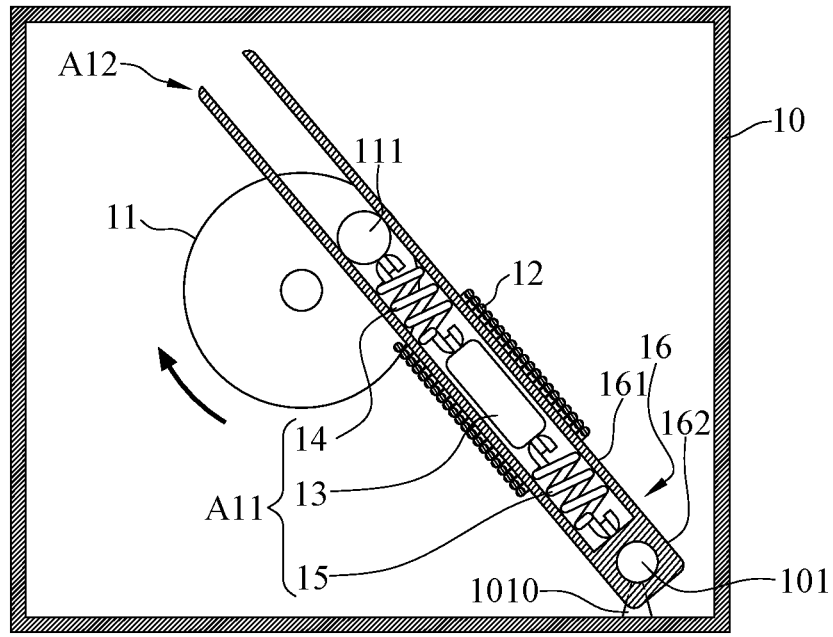
Figure 1C:
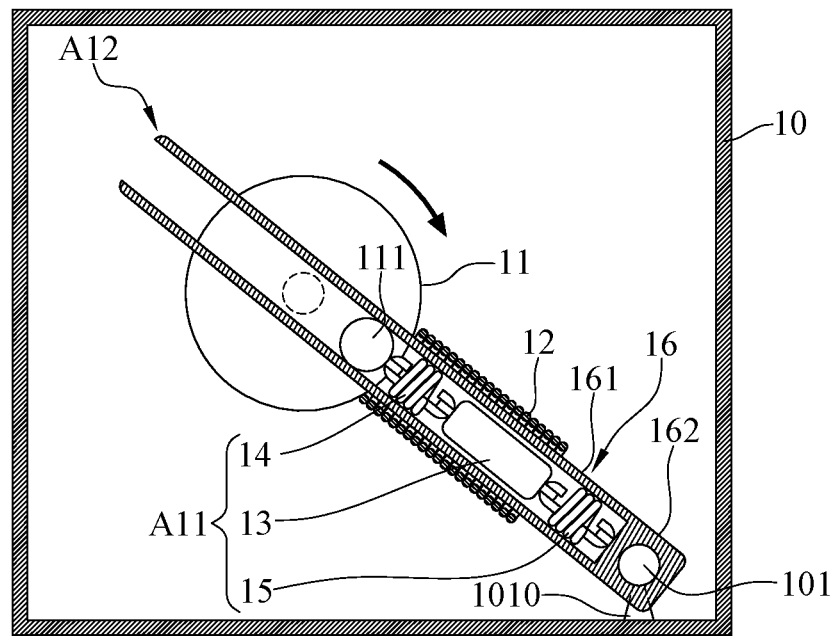

Please refer to FIGS. 1A-1C which are schematic diagrams of a co-constructed power generation device according to an embodiment of this disclosure. As shown in FIGS. 1A-1C, the co-constructed power generation device 1 comprises a shell member 10, a rotating member 11, an electromagnetic coil 12, a first power generation group A11 and a second power generation group A12. The rotating member 11, such as a circular disc, is rotatably disposed at the shell member 10. The electromagnetic coil 12, the first power generation group A11 and the second power generation group A12 are all disposed in the shell member 10. In this embodiment, the first power generation group A11 comprises a first magnetic body 13, a first elastic member 14 and a second elastic member 15, with the first and second elastic members 14 and 15 respectively connected with two ends of the first magnetic body 13 and the first magnetic body 13 suspended within the electromagnetic coil 12. The first power generation group A11 generates the shake-induced power from the relative movement between the first magnetic body 13 and the electromagnetic coil 12, with the relative movement resulted from the shake of the first magnetic body 13 caused by the external force applied to the shell member 10. In brief, the first power generation group A11 generates the shake-induced power. The second power generation group A12 comprises a connecting member 16 connecting the rotating member 11 and the shell member 10. The electromagnetic coil 12 is wrapped around the connecting member 16. When the rotating member 11 rotates, the connecting member 16 brings the first magnetic body 13 to move relatively to the electromagnetic coil 12 so as to generate the rotation-induced power. In brief, the second power generation group A12 generates the rotation-induced power.

More specifically, the connecting member 16 comprises a translation rail 161 and an end part 162, with the translation rail 161 extending from the end part 162. For example, the translation rail 161 is formed by two sidewalls extending from the end part 162. The translation rail 161 is slidably connected with a pivoting pin 111 of the rotating member 11, with the pivoting pin 111 fixed on the rotating member 11. The end part 162 of the connecting member 16 is rotatably connected with a fixed portion 101 of the shell member 10. In this embodiment, the fixed portion 101 comprises an extending pin 1010 for being fixed on the shell member 10, but the fixed portion 101 of this disclosure is not limited to comprise this member. In another embodiment, the fixed portion 101 does not have the extending pin 1010 and is directly fixed on the shell member 10. The first power generation group A11 is slidably disposed in the translation rail 161. Two ends of the first magnetic body 13 are respectively connected with the first elastic member 14 and the second elastic member 15. The end, which is not connected with the first magnetic body 13, of the first elastic member 14 is connected with the pivoting pin 111. The end, which is not connected with the first magnetic body 13, of the second elastic member 15 is connected with the fixed portion 101 of the shell member 10. When the rotating member 11 rotates, the pivoting pin 111 rotates following the rotating member 11 and slides along the translation rail 161 to bring the connecting member 16 to rotate around the fixed portion 101 as a rotary center, so that the first magnetic body 13 moves relatively to the electromagnetic coil 12. In other words, when the rotating member 11 rotates, the pivoting pin 111 slides along the translation rail 161 following the movement of the rotating member 11 to compress or stretch the first elastic member 14 as well as the second elastic member 15, so that the first magnetic body 13 moves relatively to the electromagnetic coil 12 which is wrapped around the translation rail 161.

Therefore, the first power generation group A11 can generates the shake-induced power from the relative displacement between the first magnetic body 13 and the electromagnetic coil 12 caused by the shake of the first magnetic body 13, and the second power generation group A12 converts the rotation of the rotating member 11 into the relative displacement between the first magnetic body 13 and the electromagnetic coil 12 so as to generate the rotation-induced power. The mechanism of the co-constructed power generation device 1 can perform both of the shake-induced power generation and rotation-induced power generation through the same electromagnetic coil 12 and magnetic body 13. FIGS. 1A-1C exemplarily illustrate the electromagnetic coil 12 wound around the outside of the translation rail 161. Moreover, the electromagnetic coil 12 can also be embedded in the translation rail 161 of the connecting member 16, or be wrapped around the translation rail 161 in other form, which is not limited in this disclosure.

Figure 2A:
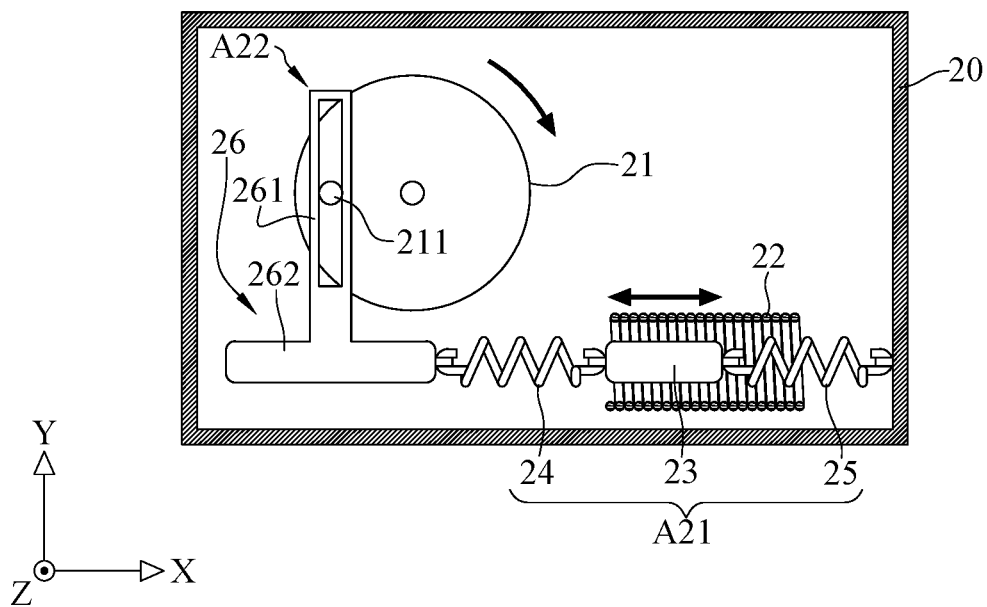
FIGS. 2A-2C are schematic diagrams of a co-constructed power generation device according to another embodiment of this disclosure.
Figure 2B:
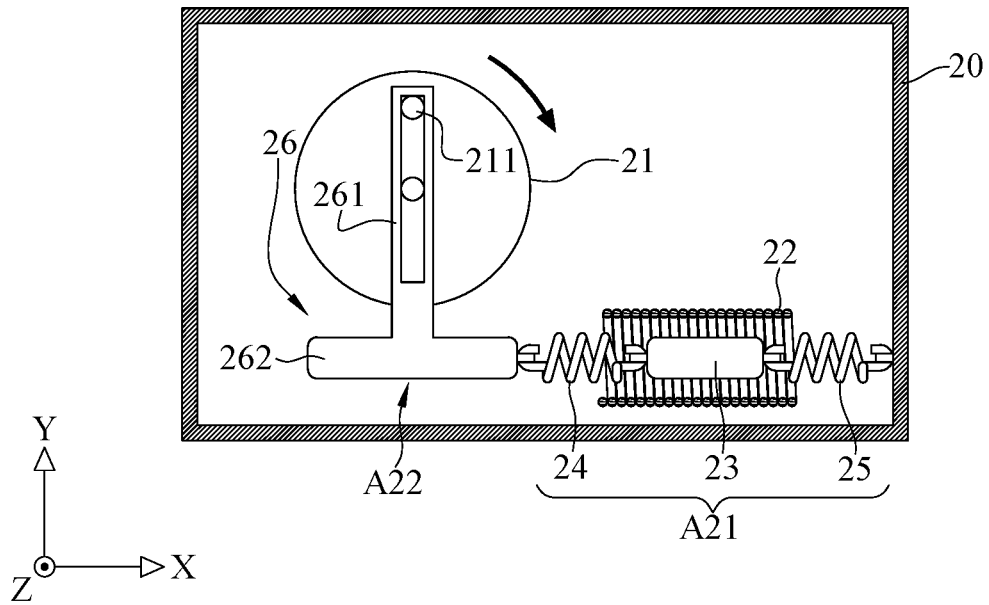
Figure 2C:
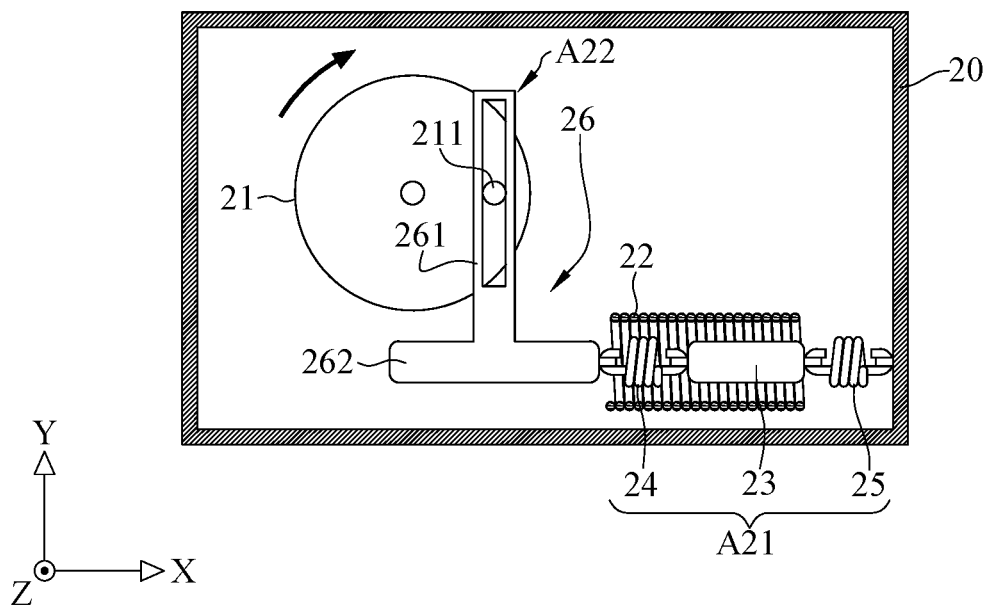

For another embodiment, please refer to FIGS. 2A-2C which are schematic diagrams of a co-constructed power generation device according to this embodiment of this disclosure. As shown in FIGS. 2A-2C, the co-constructed power generation device 2 comprises a shell member 20, a rotating member 21, an electromagnetic coil 22, a first power generation group A21 and a second power generation group A22. The rotating member 21, such as a circular disc, is rotatably disposed at the shell member 20. The electromagnetic coil 22 is fixedly disposed at the shell member 20, and the first power generation group A21 as well as the second power generation group A22 is disposed in the shell member 20. In this embodiment, the first power generation group A21 comprises a first magnetic body 23, a first elastic member 24 and a second elastic member 25, with the first and second elastic members 24 and 25 respectively connected with two ends of the first magnetic body 23 and the first magnetic body 23 suspended within the electromagnetic coil 22. The first power generation group A21 generates the shake-induced power from the relative movement between the first magnetic body 23 and the electromagnetic coil 22, with the relative movement resulted from the shake of the first magnetic body 23 caused by the external force applied to the shell member 20. The second power generation group A22 comprises a connecting member 26 connecting the rotating member 21 and the first elastic member 24. When the rotating member 21 rotates, the connecting member 26 brings the first magnetic body 23 to move relatively to the electromagnetic coil 22 so as to generate the rotation-induced power.

More specifically, in this embodiment, the connecting member 26 comprises a translation rail 261 extending along a first direction (e.g. the direction of y-axis in the figures). The translation rail 261 is slidably connected with a pivoting pin 211 of the rotating member 21, with the pivoting pin fixed on the rotating member 21. As aforementioned, the two ends of the first magnetic body 23 are respectively connected with the first elastic member 24 and the second elastic member 25. The end, which is not connected with the first magnetic body 23, of the first elastic member 24 is connected with one side of the connecting member 26; the end, which is not connected with the first magnetic body 23, of the second elastic member 25 is connected with the shell member 20. For example, as shown in FIGS. 2A-2C, the connecting member 26 can be a T-shaped rod member and comprise a translation rail 261 and an end part 262, wherein the translation rail 261 extends along the first direction (the direction of y-axis in the figures) and the end part 262 extends along the second direction (the direction of x-axis in the figures). The end part 262 sequentially connects the first elastic member 24, the first magnetic body 23, the second elastic member 25 and the shell member 20 along the second direction. In another example, the connecting member 26 can also be a rod member in L shape, I shape or other shape, which is not limited in this disclosure.

When the rotating member 21 rotates relatively to the shell member 20, the pivoting pin 211 rotates with the rotating member 21 and slides in the translation rail 261 along the first direction to bring the connecting member 26 moves back and forth along the second direction, so that the first magnetic body 23 moves along the second direction relatively to the electromagnetic coil 22 at the shell member 20. In other words, when the rotating member 21 rotates, the pivoting pin 211 brings the connecting member 26 to compress or stretch the first elastic member 24 as well as the second elastic member 25, so that the first magnetic body 23 moves relatively to the electromagnetic coil 22 fixed on the shell member 20. Therefore, the rotation of the rotating member 21 is converted into the relative displacement between the first magnetic body 23 and the electromagnetic coil 22 through the connecting member 26 of the second power generation group A22, so that the electromagnetic coil 22 cuts the magnetic field lines of the first magnetic body 23 connecting member 26, and then the rotation-induced power is generated. As aforementioned, the first power generation group A21 can generate the shake-induced power from the relative displacement between the first magnetic body 23 and the electromagnetic coil 22, with the relative displacement resulted from the shake of the first magnetic body 23. As a result, the mechanism of the co-constructed power generation device 2 can perform both of the shake-induced power generation and rotation-induced power generation through the same electromagnetic coil 22 and magnetic body 23. In this embodiment, as shown in FIGS. 2A-2C, the first direction is the direction of y-axis and the second direction is the direction of x-axis for an exemplary explanation. However, in another embodiment, the first direction and the second direction can intersect with each other to form any angle designed according to actual requirements and not limited in this disclosure.

Please refer to FIGS. 3A-3D which are schematic diagrams of a co-constructed power generation device according to yet another embodiment of this disclosure. In this embodiment, the co-constructed power generation device 3, similar to the co-constructed power generation device 2 in the above embodiment, comprises a shell member 30, a rotating member 31, an electromagnetic coil 32, a first power generation group A31 and a second power generation group A32, wherein the relative disposition among these components is similar to that of the co-constructed power generation device 2 in the above embodiment so it is not repeated. The first power generation group A31 comprises a first magnetic body 33, a first elastic member 34 and a second elastic member 35, with the first and second elastic members 34 and 35 respectively connected with two ends of the first magnetic body 33 and the first magnetic body 33 suspended within the electromagnetic coil 32. The second power generation group A32 comprises a connecting member 36 connecting the rotating member 31 and the first elastic member 34. The connecting member 36 comprises a rod member 361 and a third elastic member 362 wherein two ends of the third elastic member 362 are respectively connected with one side of the rod member 361 and the shell member 30, and the other side of the rod member 361 is connected with an end of the first elastic member 34, with said end of the first elastic member not connected with the first magnetic body 33. The rod member 361 comprises a translation rail 3611 extending along the first direction. The translation rail 3611 is slidably and detachably connected with a pivoting pin 311 of the rotating member 31. More specifically, the length of the translation rail 3611 is less than the diameter of the rotating member 31. The translation rail 3611 comprises an opening 3612 at the end which is near the rotary center of the rotating member 31, and a valve 3613 is disposed in the position on the translation rail 3611 corresponding to the rotary path of the pivoting pin 311. The valve 3613 can rotates around a fixed portion of the translation rail 3611 as a rotary center so as to enter the interior space of the translation rail 3611.

Figure 3A:
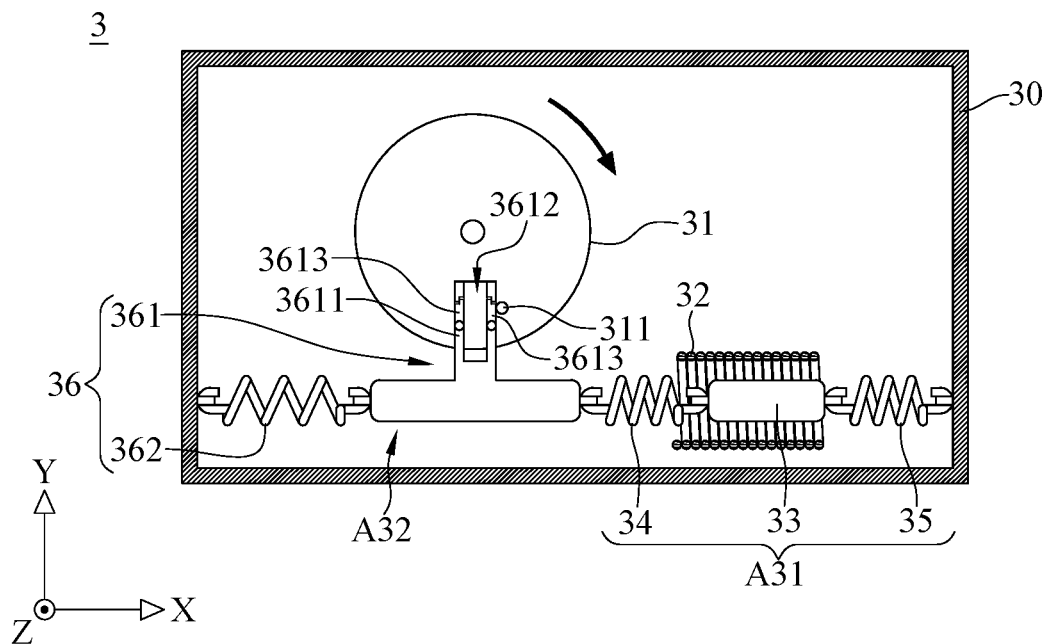
FIGS. 3A-3D are schematic diagrams of a co-constructed power generation device according to yet another embodiment of this disclosure.
Figure 3B:
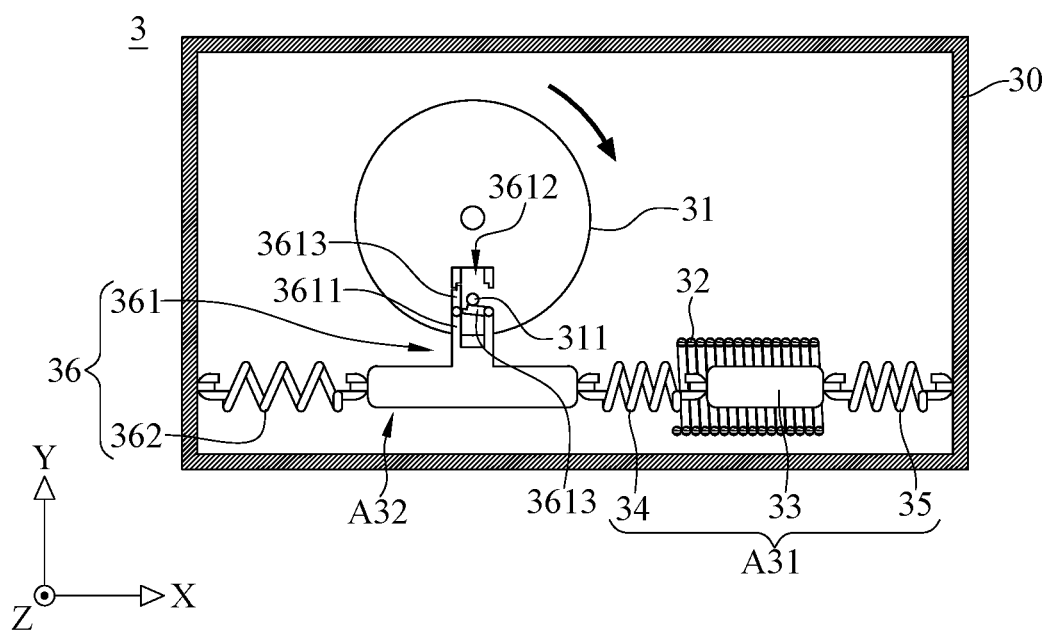
Figure 3C:
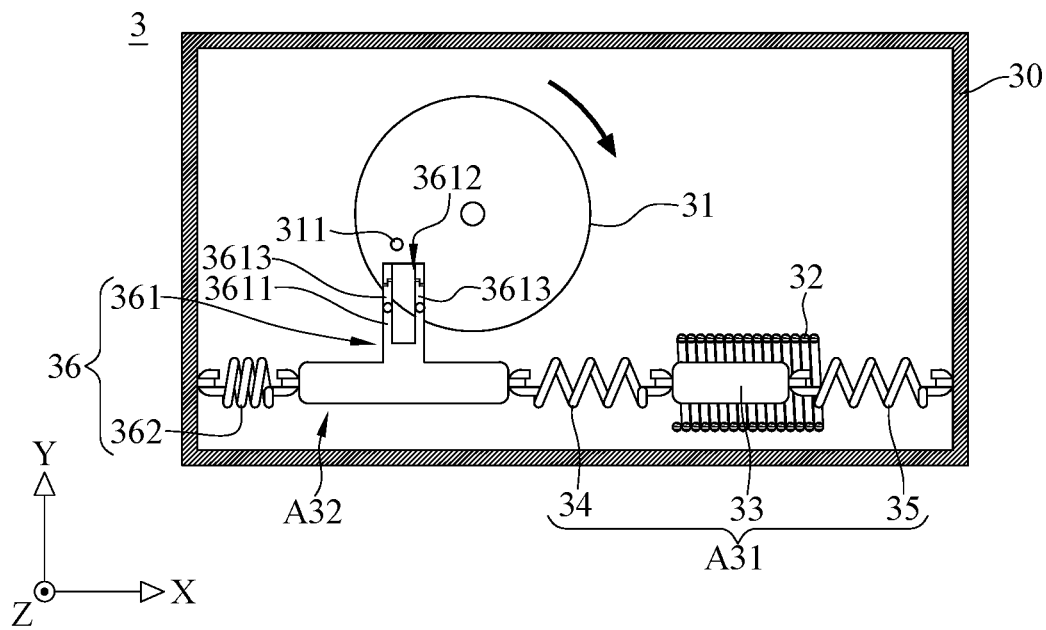
Figure 3D:
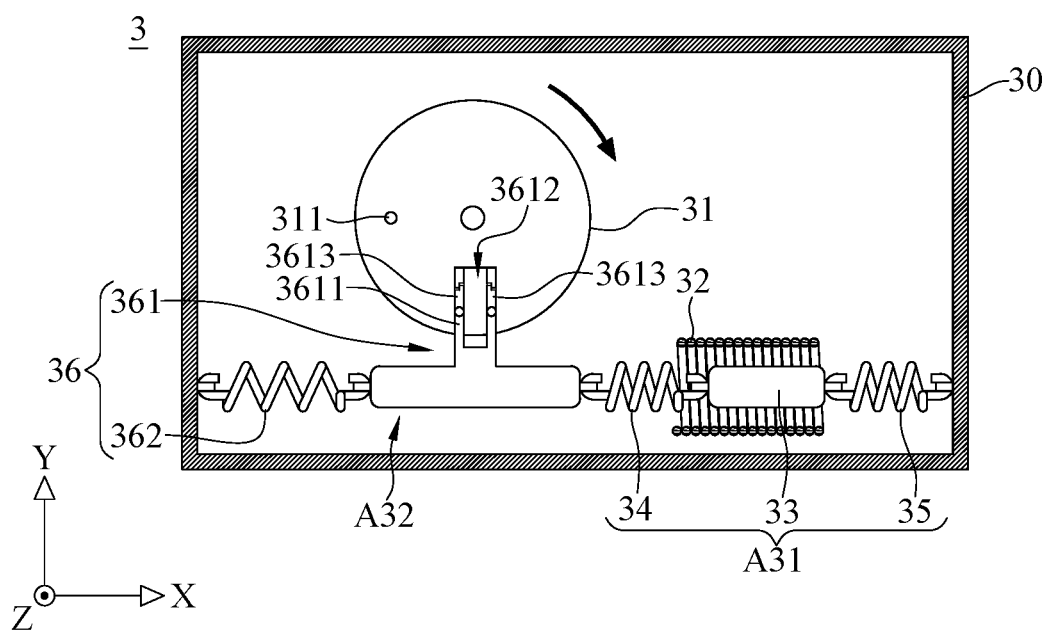

As shown in FIGS. 3A-3B, the pivoting pin 311 rotates along the rotary path to the outside of the translation rail 3611, and then enters the interior space of the translation rail 3611 via the valve 3613 and slides in the translation rail 3611 along the first direction (the direction of y-axis in the figures) to bring the first power generation group A31 moves along the second direction (the direction of x-axis in the figures), so that the first magnetic body 33 moves relatively to the electromagnetic coil 32. Afterwards, as shown in FIGS. 3C-3D, the pivoting pin 311 leaves the interior space of the translation rail 3611 via the opening 3612 at the end of the translation rail 3611, and the rod member 361 returns to the position relative to the rotating member 31 as shown in FIG. 3A through the release of the elastic potential of the third elastic member 362. In this embodiment, the detachable connection between the pivoting pin 311 and the translation rail 3611 may allow the shake of first magnetic body 33 not to be limited by the pivoting pin 311 when the pivoting pin 311 is outside of the translation rail 3611, so that the co-constructed power generation device 3 may have better power generation efficiency. In this embodiment, as shown in FIGS. 3A-3D, the first direction is the direction of y-axis and the second direction is the direction of x-axis for an exemplary explanation. However, in another embodiment, the first direction and the second direction can intersect with each other to form any angle designed according to actual requirements and not limited in this disclosure.

Figure 4:
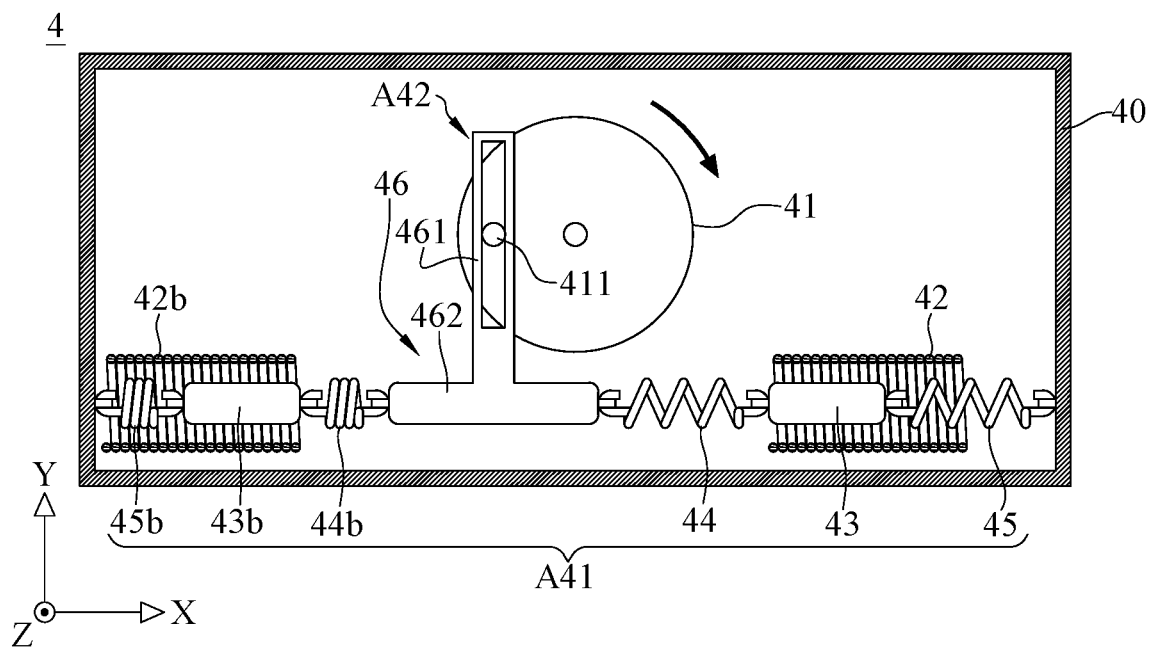
FIG. 4 is a schematic diagram of a co-constructed power generation device according to yet another embodiment of this disclosure.

For yet another embodiment, please refer to FIG. 4 which is a schematic diagram of a co-constructed power generation device according to this another embodiment of this disclosure. As shown in FIG. 4, the co-constructed power generation device 4, similar to the co-constructed power generation device 2 or 3 in the above embodiments, comprises a shell member 40, a rotating member 41, an electromagnetic coil 42, a first power generation group A41 and a second power generation group A42, wherein the relative disposition among these components is similar to that of the co-constructed power generation device 2 or 3 in the above embodiments so it is not repeated. In this embodiment, besides the above components, the co-constructed power generation device 4 further comprises a second electromagnetic coil 42b fixed on the shell member 40. Moreover, besides the first magnetic body 43, the first elastic member 44 and the second elastic member 45 respectively connected with two ends of the first magnetic body 43, the first power generation group A41 co-constructed power generation device 4 further comprises a second magnetic body 43b, a third elastic member 44b and a fourth elastic member 45b. The second magnetic body 43b is suspended within the second electromagnetic coil 42b. Two ends of the third elastic member 44b are respectively connected with the second magnetic body 43b and the connecting member 46 of the second power generation group A42. In other words, the connecting member 46 is connected with the first elastic member 44 via one side, and connected with the third elastic member 44b via the other side. Two ends of the fourth elastic member 45b are respectively connected with the second magnetic body 43b and the shell member 40.

When an external force is applied to the shell member 40, the first magnetic body 43 and the second magnetic body 43b are shaken by the external force. As a result, the first magnetic body 43 moves relatively to the electromagnetic coil 42 and the second magnetic body 43b moves relatively to the second electromagnetic coil 42b so as to generate the electric power. As described in the above embodiments, when the rotating member 41 rotates, the connecting member 46 moves back and forth along the second direction since it is connected with the pivoting pin 411 of the rotating member 41. In this embodiment, the connecting member 46 simultaneously brings the first magnetic body 43 to move back and forth relatively to the electromagnetic coil 42 and the second magnetic body 43b to move back and forth relatively to the second electromagnetic coil 42b. More specifically, as shown in FIG. 4, the connecting member 46 moves back and forth along the second direction so as to compress the first and second elastic member 44 and 45 but stretch the third and fourth elastic member 44b and 45b, or to stretch the first and second elastic member 44 and 45 but compress the third and fourth elastic member 44b and 45b. Simultaneously, the connecting member 46 brings the first magnetic body 43 and the second magnetic body 43b to move back and forth along the second direction. During this movement of the first and second magnetic bodies 43 and 43b, the magnetic field lines generated by the first magnetic body 43 are cut by the electromagnetic coil 42 fixed on the shell member 40, and the magnetic field lines generated by the second magnetic body 43b are cut by the second electromagnetic coil 42b fixed on the shell member 40, so as to generate the electric power.

Figure 5A:
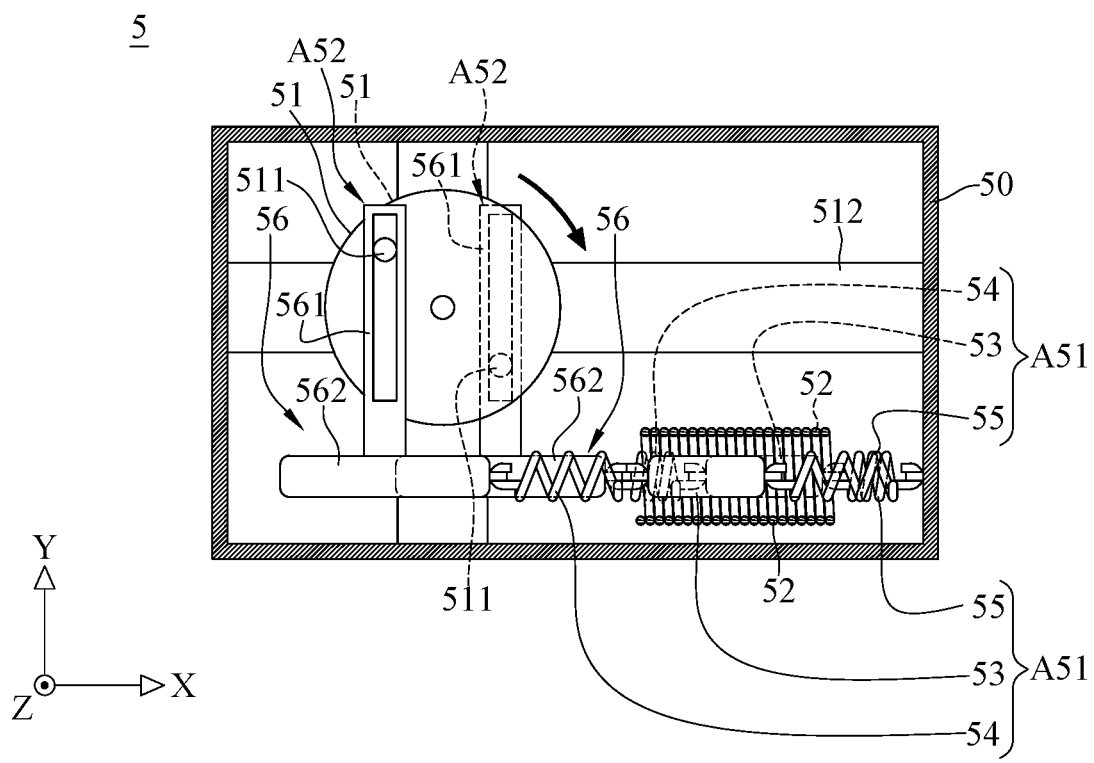
FIGS. 5A-5B are schematic diagrams of a co-constructed power generation device according to yet another embodiment of this disclosure.
Figure 5B:
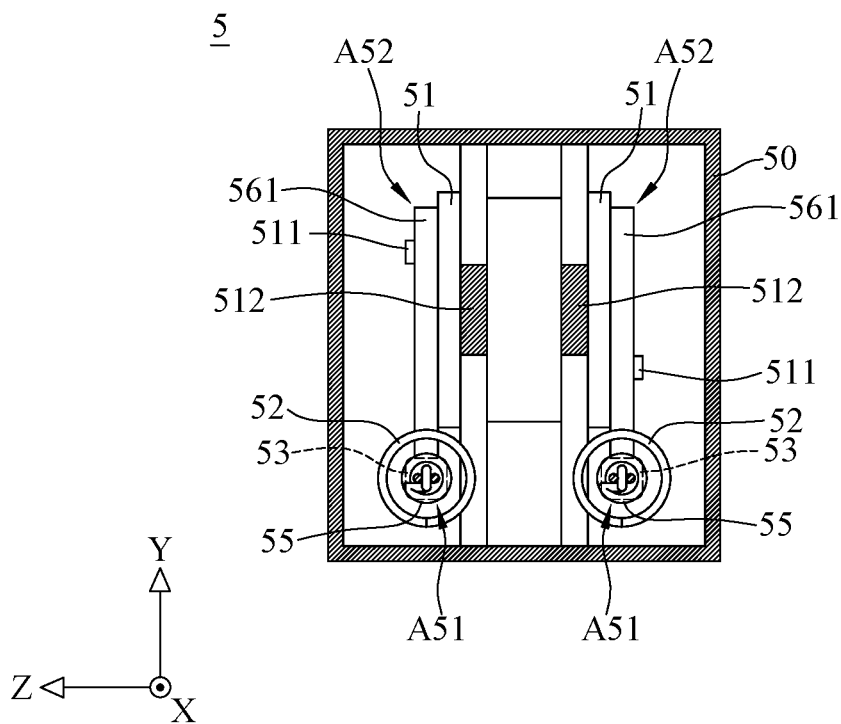

Please refer to FIGS. 5A-5B which are schematic diagrams of a co-constructed power generation device according to yet another embodiment of this disclosure, wherein FIG. 5A is a front sectional view of the co-constructed power generation device, and FIG. 5B is a side sectional view of the co-constructed power generation device. In this embodiment, the co-constructed power generation device 5 comprises a shell member 50, a rotating member 51 and two sets of the first and second power generation groups A51 and A52 as aforementioned. The two sets of the first and second power generation groups A51 and A52 are respectively disposed on the front and the back of the rotating member 51, wherein the power generation mechanism of each first power generation group A51 in the two sets is similar to that of the first power generation group described in the above embodiments, and the power generation mechanism of each second power generation group A52 in the two sets is similar to that of the second power generation group described in the above embodiments, so the related details are not repeated. In FIGS. 5A-5B, the co-constructed power generation device 5 is exemplarily illustrated to comprise two sets of the first and second power generation groups A21 and A22 as described in the embodiment of FIGS. 2A-2C; however, the co-constructed power generation device 5 can also comprise two sets of the first and second power generation groups as described in the embodiment of FIGS. 1A-1C, FIGS. 3A-3D or FIG. 4, or respectively belonging to two of the embodiments of FIGS. 1A-1C, FIGS. 2A-2C, FIGS. 3A-3D and FIG. 4. In FIGS. 5A-5B, the rotating member 51 is pivoted on the shell member 50 via a rotating base 512. Moreover, in each of the above embodiments, the rotating member can also be rotatably disposed in the shell member via a rotating base or other structure.

Figure 6:
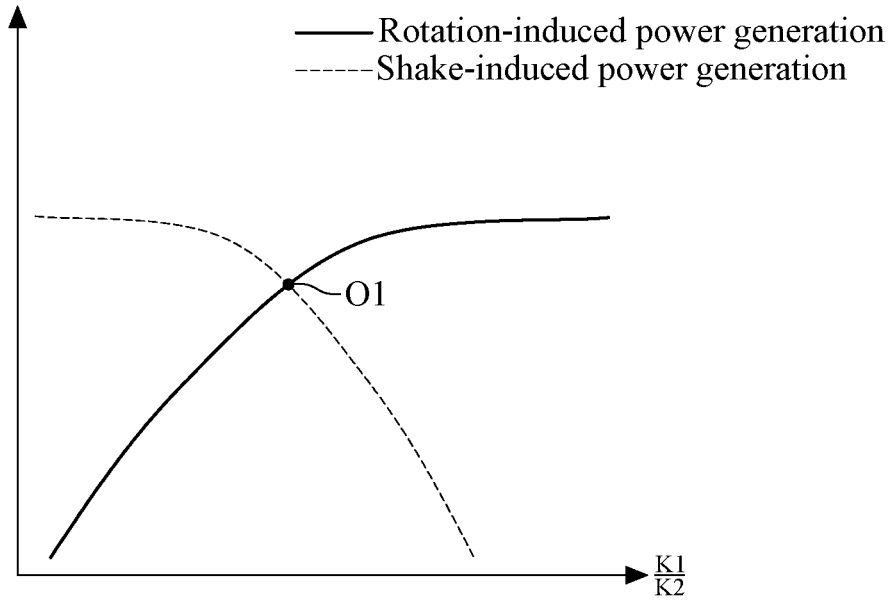
FIG. 6 is an elastic modulus ratio versus power generation efficiency graph of a co-constructed power generation device according to an embodiment of this disclosure.

In the above one or more embodiments, the connecting member bring the first elastic member and the second elastic member to move relatively to each other so as to convert the kinetic energy of the first magnetic body into electric power. If the elastic modulus of the first elastic member is designed to be quite low, the displacement of the connecting member is mostly absorbed by the deformation of the elastic member, so that the displacement of the first magnetic body is less and the power generation efficiency is low. On the contrary, if the elastic modulus of the first elastic member is designed to be quite high, the first elastic member is hard to be deformed, so that the first magnetic body is hard to be shaken by the external force applied to the shell member to generate electric power. For obtaining an appropriate set of elastic moduli, please refer to FIG. 6 which is an elastic modulus ratio versus power generation efficiency graph of a co-constructed power generation device according to an embodiment of this disclosure. In FIG. 6, the x-axis indicates the ratio of the elastic modulus of the first elastic member to the elastic modulus of the second elastic member, and the y-axis indicates the power generation efficiency of the co-constructed power generation, wherein the power generation efficiency has a positive correlation with the electric power. The formula of the electric power is shown as follows:

$$P = \frac{(BvL)^2}{R},$$

wherein "P" indicates the electric power; "B" indicates the magnetic field; "v" indicates the moving speed of the magnetic body; and "R" indicates the system loading resistance.

As shown in FIG. 6, for the shake-induced power generation, as the elastic modulus K1 of the first elastic member increases, the first elastic member is harder to being shaken by the external force applied to the shell member, so that the shaking power generation efficiency decreases as the elastic modulus K1 of the first elastic member increases. In contrast, for the rotation-induced power generation, as the elastic modulus K1 of the first elastic member increases, the first elastic member is harder to be deformed, so that it is easier to bring the first magnetic body to move as the connecting member moves, and the rotating power generation efficiency increases as the elastic modulus K1 of the first elastic member increases. Therefore, the shaking power generation efficiency curve and the rotating power generation efficiency curve converge with each other at a point O1. More particularly, the elastic modulus ratio corresponding to the point O1 indicates that the elastic modulus of the first elastic member is larger than that of the second elastic member. By disposing the first and second elastic members having the above elastic modulus ratio (corresponding to the point O1) therebetween in the co-constructed power generation device, great power generation efficiency of the co-constructed power generation device in both the shake-induced power generation mode and the rotation-induced power generation mode may be achieved. In the above embodiment, the ratio of the elastic modulus of the third elastic member to that of the fourth elastic member is similar to the ratio of the elastic modulus of the first elastic member to that of the second elastic member as aforementioned, so the related details are not repeated.

The mechanism of the co-constructed power generation device as described in the above one or more embodiments can perform both of shake-induced power generation and rotation-induced power generation through the same set of magnetic body and electromagnetic coil, so that the space conventionally required for disposing the power generation structures respectively corresponding to the two types of power generation may be simplified, and the overall size of the power generation device may be reduced.

Figure 7A:
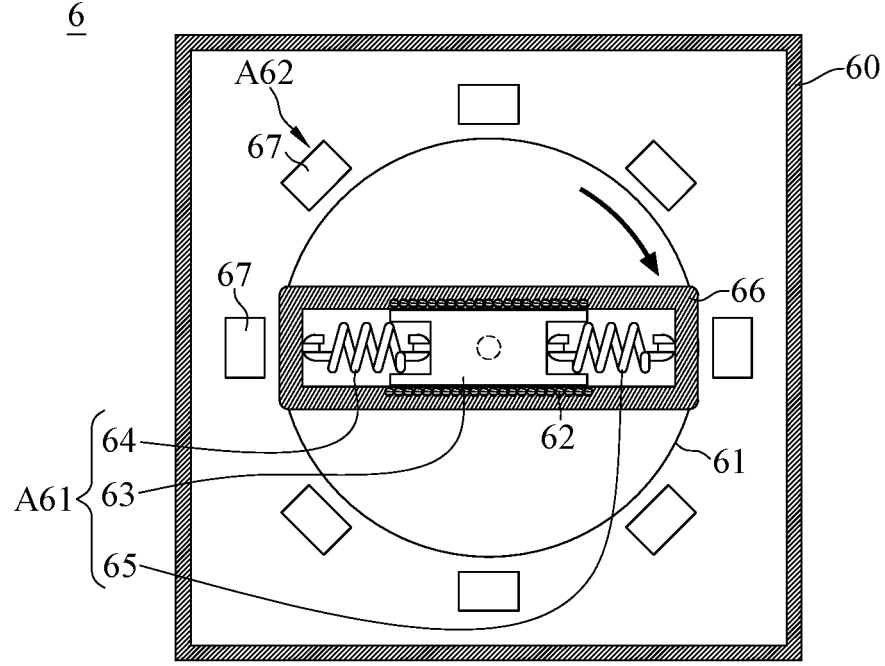
FIGS. 7A-7B are schematic diagrams of a co-constructed power generation device according to yet another embodiment of this disclosure.
Figure 7B:
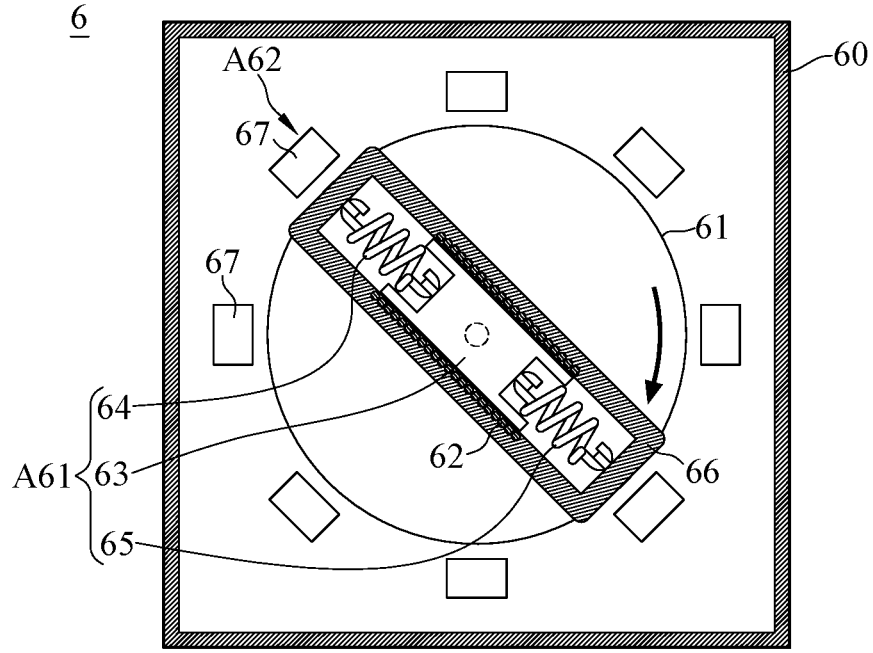

Please refer to FIGS. 7A-7B which are schematic diagrams of a co-constructed power generation device according to yet another embodiment of this disclosure. As shown in FIGS. 7A-7B, the co-constructed power generation device 6 comprises a shell member 60, a rotating member 61, an electromagnetic coil 62, a first power generation group A61 generating the shake-induced power, and a second power generation group A62 generating the rotation-induced power, wherein the rotating member 61 is rotatably disposed at the shell member 60, the electromagnetic coil 62 is disposed at the rotating member 61, and the first and second power generation groups A61 and A62 are disposed in the shell member 60. The first power generation group A61 comprises a first magnetic body 63, a first elastic member 64 and a second elastic member 65, wherein the first magnetic body 63 is suspended within the electromagnetic coil 62, and two ends of the first magnetic body 63 are respectively connected with the first elastic member 64 and the second elastic member 65.

More specifically, a rod member 66 is disposed at the rotating member 61 and has an accommodating space therein. The electromagnetic coil 62 is wrapped around this accommodating space, and the first power generation group A61 is disposed in this accommodating space. The first power generation group A61 is connected with the rod member 66 via one end of the first elastic member 64 and one end of the second elastic member 65 so as to suspend the first magnetic body 63 within the accommodating space, wherein said ends of the first and second members 64 and 65 are not connected with the first magnetic body 63. More particularly, it is preferable that the elastic modulus of the first elastic member 64 is the same as that of the second elastic member 65, so that the first magnetic body 63 may be suspended in the center of the accommodating space and the probability of colliding with the inner wall of the rod member 66 by the first magnetic body 63 may be reduced. In this embodiment, the electromagnetic coil 62 is embedded in the sidewall of the rod member 66. In another embodiment, the electromagnetic coil 62 can also be wrapped on the external surface of the rod member 66. When an external force is applied to the shell member 60, this external force causes the shake of the first magnetic body 63 and the relative movement between the first magnetic body 63 and the electromagnetic coil 62, so that electric power is generated by shaking. The second power generation group A62 comprises a plurality of second magnetic bodies 67 disposed at the shell member 60 and surrounding the electromagnetic coil 62. When the rotating member 61 rotates, the electromagnetic coil 62 disposed at the rotating member 61 moves relatively to the second magnetic body 67 so that electric power is generated by rotating.

Figure 8A:
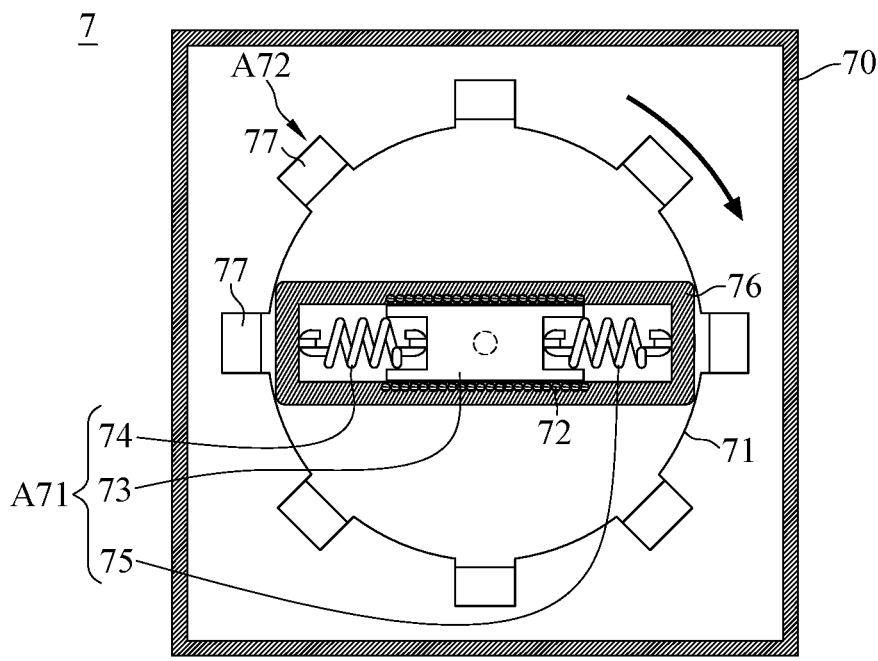
FIGS. 8A-8B are schematic diagrams of a co-constructed power generation device according to yet another embodiment of this disclosure.
Figure 8B:
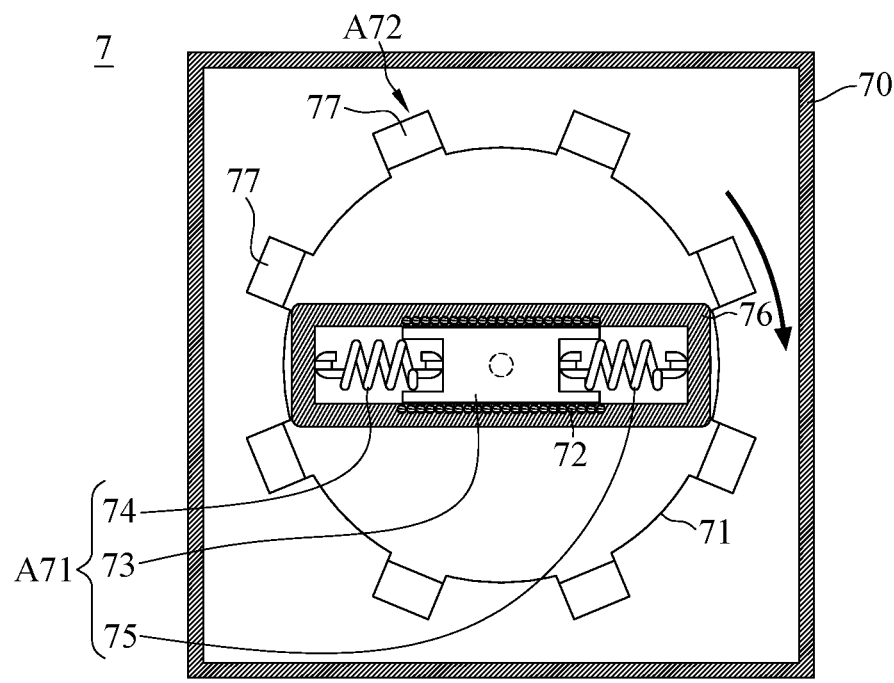
Figure 9A:
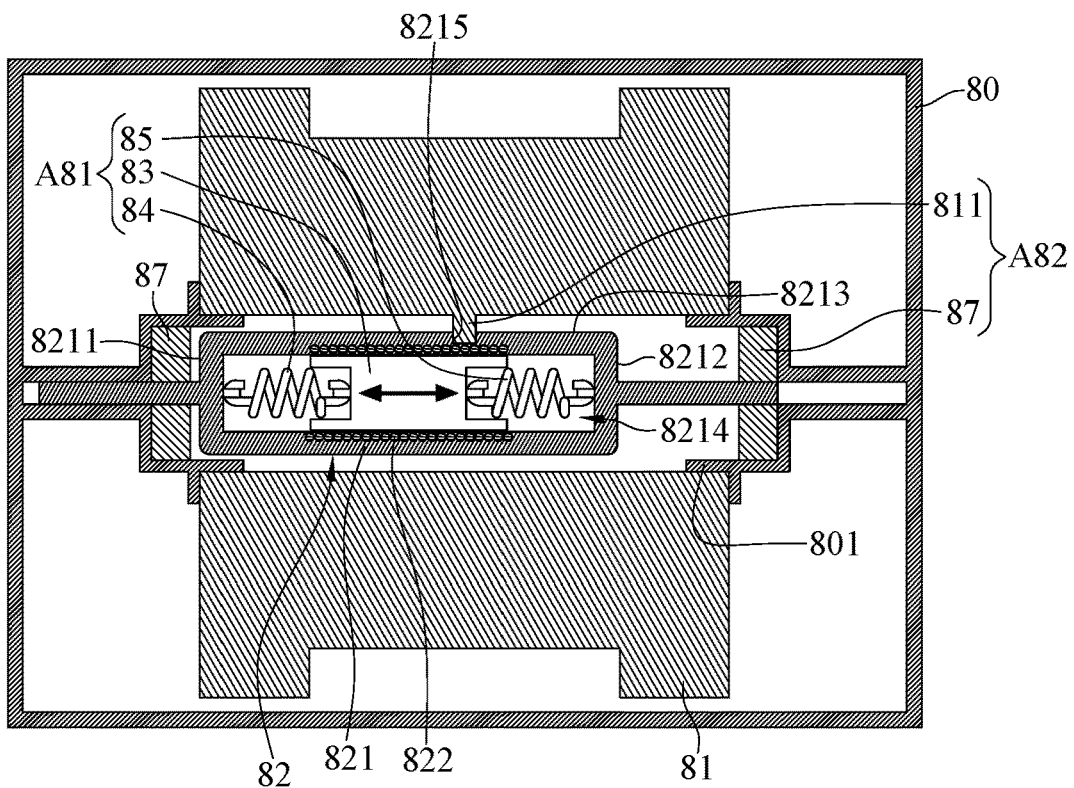
FIGS. 9A-9D are schematic diagrams of a co-constructed power generation device according to yet another embodiment of this disclosure.
Figure 9B:
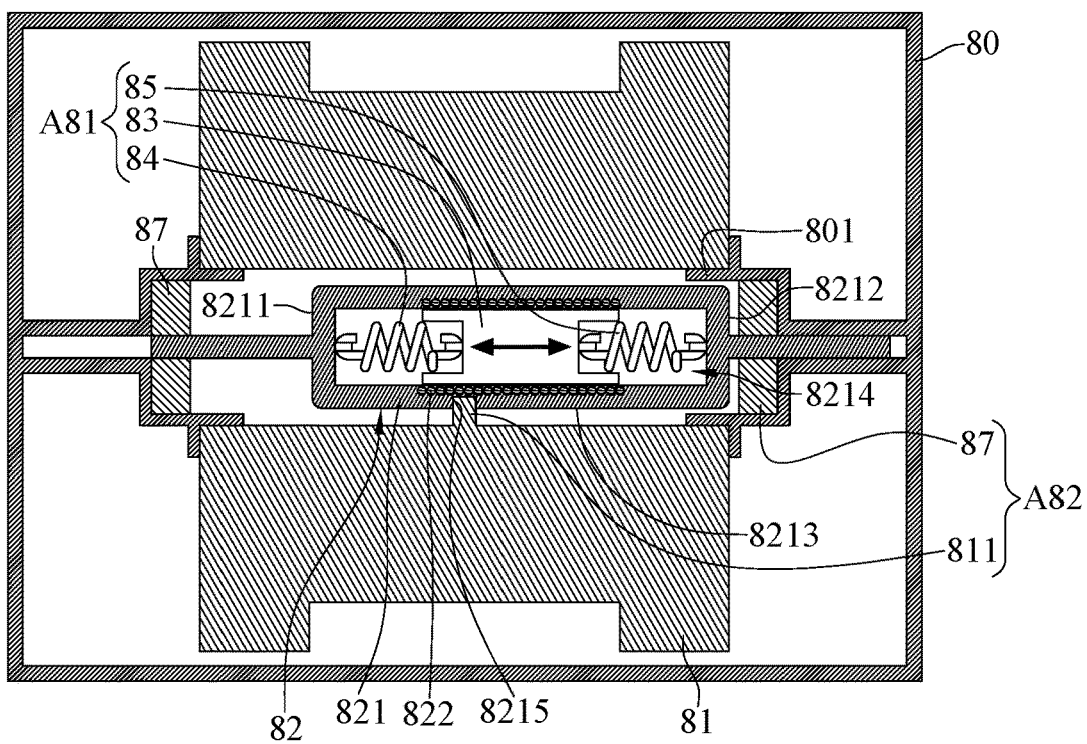
Figure 9C:
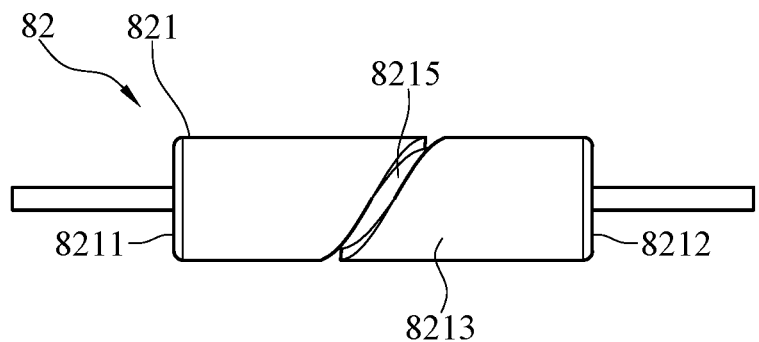
Figure 9D:
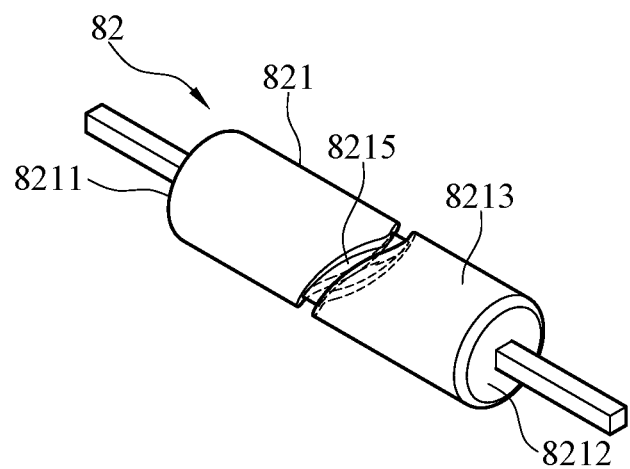

For yet another embodiment, please refer to FIGS. 8A-8B which are schematic diagrams of a co-constructed power generation device according to this embodiment of this disclosure. As shown in FIGS. 8A-8B, the co-constructed power generation device 7, similar to the co-constructed power generation device 6 in the above embodiment, comprises a shell member 70, a rotating member 71, an electromagnetic coil 72, a first power generation group A71 generating the shake-induced power, and a second power generation group A72 generating the rotation-induced power, wherein the rotating member 71 is rotatably disposed at the shell member 70. The first power generation group A61 similarly comprises a first magnetic body 73, a first elastic member 74 and a second elastic member 75, wherein the first magnetic body 73 is suspended within the electromagnetic coil 72, and two ends of the first magnetic body 73 are respectively connected with the first elastic member 74 and the second elastic member 75. Moreover, the second power generation group A72 similarly comprises a plurality of second magnetic bodies 77 surrounding the electromagnetic coil 72. The difference between this embodiment and the previous embodiment of FIGS. 7A-7B is that the electromagnetic coil 72 is disposed at the shell member 70 and the second magnetic bodies 77 of the second power generation group A72 are disposed at the rotating member 71.

More specifically, a rod member 76 is disposed at the shell member 70 of the co-constructed power generation device 7. Similar to the rod member 66 in the previous embodiment, the rod member 76 has an accommodating space for accommodating the first power generation group A71, wherein the accommodating space is surrounded by the electromagnetic coil 72. In this embodiment, one end of the first elastic member 74 of the first power generation group A71 and one end of the second elastic member 75 of the first power generation group A71 are fixedly connected with the rod member 76 in its accommodating space, and the other end of the first elastic member 74 and the other end of the second elastic member 75 are respectively connected with two ends of the first magnetic body 73 so as to suspend the first magnetic body 73 in the accommodating space. More particularly, it is preferable that the elastic modulus of the first elastic member 74 is the same as that of the second elastic member 75, so that the first magnetic body 73 may be suspended in the center of the accommodating space and the probability of colliding with the inner wall of the rod member 76 by the first magnetic body 73 may be reduced. The electromagnetic coil 72 can be embedded in the sidewall of the rod member 76, or be wrapped on the external surface of the rod member 76. In this embodiment, when the rotating member 71 rotates, the second magnetic bodies 77 disposed at the rotating member 71 rotates and moves relatively to the electromagnetic coil 72 fixed at the shell member 70 so that electric power is generated.

Please refer to FIGS. 9A-9D which are schematic diagrams of a co-constructed power generation device according to yet another embodiment of this disclosure. As shown in FIGS. 9A-9D, the co-constructed power generation device 8 comprises a shell member 80, rotating member 81, an electromagnetic coil group 82, a first power generation group A81 generating the shake-induced power, and a second power generation group A82 generating the rotation-induced power, wherein the rotating member 81 is rotatably disposed at the shell member 80. More specifically, the shell member 80 comprises a spindle 801 to be pivoted by the rotating member 81. The electromagnetic coil group 82 is movably disposed in the spindle 801, and the first power generation group A81 is disposed in the electromagnetic coil group 82. The electromagnetic coil group 82 comprises a rod member 821 and an electromagnetic coil 822, wherein the rod member 821 is configured to accommodate the first power generation group A81 and the electromagnetic coil 822 is wrapped around the rod member 821. In this embodiment, the electromagnetic coil 822 is embedded in the sidewall of the rod member 821.

The first power generation group A81 comprises a first magnetic body 83, a first elastic member 84 and a second elastic member 85, wherein the first magnetic body 83 is connected with the first elastic member 84 and the second elastic member 85 and suspended within the electromagnetic coil 822. More specifically, the rod member 821 comprises a first end part 8211, a second end part 8212 and a sidewall 8213 which extends from the first end part 8211 to the second part 8212. The first end part 8211, the second end part 8214 and the sidewall 8213 form an accommodating space 8214 together. Two ends of the first magnetic body 83 are respectively connected with the first elastic member 84 and the second elastic member 85. The end, which is not connected with the first magnetic body 83, of the first elastic member 84 is connected with the first end part 8211 of the rod member 821, and the end, which is not connected with the first magnetic body 83, of the second elastic member 85 is connected with the second end part 8212, so as to suspend the first magnetic body 83 in the accommodating space 8214. More particularly, it is preferable that the elastic modulus of the first elastic member 84 is the same as that of the second elastic member 85, so that the first magnetic body 83 may be suspended in the center of the accommodating space 8214 and the probability of colliding with the inner wall of the rod member 86 by the first magnetic body 73 may be reduced. The external force applied to the shell member 80 causes the shake of the first magnetic body 83 and the relative movement between the first magnetic body 83 and the electromagnetic coil 62, so that electric power is generated by shaking. The second power generation group A82 comprises a connecting member 811 disposed at the rotating member 81, and a second magnetic assembly 87. More particularly, the second magnetic assembly 87 comprises two magnetic bodies respectively disposed at two ends of the spindle 801. When the rotating member 81 rotates, the connecting member 811 brings the electromagnetic coil group 82 to move relatively to the second magnetic assembly 87 so as to generate electric power.

More specifically, the rod member 821 is slidably connected with the shell member 80 via the first end part 8211 and the second end part 8212. There is a closed-loop groove 8215 disposed on the external surface of the sidewall 8213 of the rod member 821, and this closed-loop groove 8215 is slidably connected with the connecting member 811. When the rotating member 81 rotates, the connecting member 811 slides along the closed-loop groove 8215 on the rod member 821 so as to bring the electromagnetic coil group 82 to move relatively to the second magnetic assembly 87 along the direction in which the spindle 801 extends. More particularly, each of the first and second end parts 8211 and 8212 of the rod member 821 comprises a connecting bar for slidably connected with the shell member 80. The cross-section of the connecting bar is designed to be a polygon in order to avoid the situation that the electromagnetic coil group 82 is rotated by the friction between the connecting member 811 and the closed-loop groove 8214 when the rotating member 81 rotates. Moreover, FIGS. 9C-9D exemplarily illustrate the track of the closed-loop groove 8215; however, the track of the closed-loop groove 8215 in practice can be designed based on requirements.

In the aforementioned embodiments, the electromagnetic coil can be connected with power storage for storing the generated electric power. In each figure of this disclosure, the cross-section of the shell member is exemplarily illustrated as a rectangle; however, the cross-section of the shell member can also be designed to be a circle or other shape based on actual requirements, and is not limited in this disclosure. Moreover, in each of the schematic diagrams corresponding to the above embodiments, the clockwise arrow indicates the rotary direction of the rotating member for the exemplary explanation of the operation mechanism of the co-constructed power generation device, and the co-constructed power generation device also has the similar operation mechanism when the rotating member rotates counterclockwise.

In view of the above description, the co-constructed power generation device provided in this disclosure performs both of shake-induced power generation and rotation-induced power generation through the same one electromagnetic coil and one or more magnetic bodies, so that the space conventionally required for disposing the power generation structures respectively corresponding to the two types of power generation may be simplified, the overall size of the power generation device may be reduced, and the usage convenience of the power generation device may be improved. Moreover, by the design of the elastic moduli of the elastic members disposed in the co-constructed power generation device of this disclosure, the co-constructed power generation device may have great power generation efficiency in both the shake-induced power generation mode and the rotation-induced power generation mode. In addition, the collision between the magnetic body and the shell member/rod member may be reduced.

What is claimed is:

1. A co-constructed power generation device, comprising a shell member, a first power generation group and a second power generation group, wherein the first power generation group is disposed in the shell member and generates shake-induced power, and the second power generation group is disposed in the shell member and generates rotation-induced power, and further comprising:
    a rotating member, rotatably disposed at the shell member; and
    an electromagnetic coil, disposed at the shell member;
    wherein the first power generation group comprises a first magnetic body, a first elastic member and a second elastic member, with the first and second elastic members respectively connected with two ends of the first magnetic body and the first magnetic body suspended within the electromagnetic coil, wherein the shake-induced power is generated from relative movement between the first magnetic body and the electromagnetic coil, with the relative movement resulted from a shake of the first magnetic body caused by an external force applied to the shell member, wherein the second power generation group comprises a connecting member connecting the rotating member and the first elastic member, and when the rotating member rotates, the connecting member brings the first magnetic body to move relatively to the electromagnetic coil so as to generate the rotation-induced power;
    wherein the connecting member comprises a translation rail extending in a first direction and slidably connected with a pivoting pin of the rotating member, an end of the first elastic member is connected with a side of the connecting member and an end of the second elastic member is connected with the shell member, with said ends of the first and second elastic members are ends that are not connected with the first magnetic body, wherein when the rotating member rotates, the pivoting pin slides along the translation rail to bring the connecting member to move along a second direction so that the first magnetic body moves along the second direction relatively to the electromagnetic coil, with the second direction intersecting with the first direction.

2. The co-constructed power generation device according to claim 1, further comprising a second electromagnetic coil, wherein the first power generation group further comprises a second magnetic body, a third elastic member and a fourth elastic member, with the third and fourth elastic members respectively connected with two ends of the second magnetic body, and the second magnetic body suspended within the second electromagnetic coil, wherein the shake-induced power is further generated from relative movement between the second magnetic body and the second electromagnetic coil, with the relative movement resulted from a shake of the second magnetic body caused by the external force applied to the shell member, wherein an end of the third elastic member is connected with another side of the connecting member and an end of the fourth elastic member is connected with the shell member, with said ends of the third and fourth elastic members are ends that are not connected with the second magnetic body, wherein when the rotating member rotates, the connecting member further brings the second magnetic body to move along the second direction relatively to the second electromagnetic coil.

3. The co-constructed power generation device according to claim 1, wherein an elastic modulus of the first elastic member is larger than an elastic modulus of the second elastic member.

4. A co-constructed power generation device, comprising a shell member, a first power generation group and a second power generation group, wherein the first power generation group is disposed in the shell member and generates shake-induced power, and the second power generation group is disposed in the shell member and generates rotation-induced power, and further comprising:
    a rotating member, rotatably disposed at the shell member; and
    an electromagnetic coil, disposed at the shell member;
    wherein the first power generation group comprises a first magnetic body, a first elastic member and a second elastic member, with the first and second elastic members respectively connected with two ends of the first magnetic body and the first magnetic body suspended within the electromagnetic coil, wherein the shake-induced power is generated from relative movement between the first magnetic body and the electromagnetic coil, with the relative movement resulted from a shake of the first magnetic body caused by an external force applied to the shell member, wherein the second power generation group comprises a connecting member connecting the rotating member and the first elastic member, and when the rotating member rotates, the connecting member brings the first magnetic body to move relatively to the electromagnetic coil so as to generate the rotation-induced power;

wherein the connecting member comprises a rod member and a third elastic member, an end of the first elastic member is connected with a side of the rod member and an end of the second elastic member is connected with the shell member, with said ends of the first and second elastic members are ends that are not connected with the first magnetic body, with two ends of the third elastic member respectively connected with another side of the rod member and the shell member, wherein the rod member comprises a translation rail extending in a first direction, slidably connected with a pivoting pin of the rotating member, and comprising an opening at an end thereof, with a valve disposed in a position on the translation rail corresponding to a rotary path of the pivoting pin, and the valve rotating around a fixed portion of the translation rail as a rotary center so as to enter an interior space of the translation rail, wherein when the rotating member rotates, the pivoting pin enters the interior space of the translation rail through the valve to slide along the translation rail to bring the connecting member to move along a second direction, so that the first magnetic body moves along the second direction relatively to the electromagnetic coil, with the second direction intersecting with the first direction.

5. The co-constructed power generation device according to claim 4, further comprising a second electromagnetic coil, wherein the first power generation group further comprises a second magnetic body, a third elastic member and a fourth elastic member, with the third and fourth elastic members respectively connected with two ends of the second magnetic body, and the second magnetic body suspended within the second electromagnetic coil, wherein the shake-induced power is further generated from relative movement between the second magnetic body and the second electromagnetic coil, with the relative movement resulted from a shake of the second magnetic body caused by the external force applied to the shell member, wherein an end of the third elastic member is connected with another side of the connecting member and an end of the fourth elastic member is connected with the shell member, with said ends of the third and fourth elastic members are ends that are not connected with the second magnetic body, wherein when the rotating member rotates, the connecting member further brings the second magnetic body to move along the second direction relatively to the second electromagnetic coil.

6. The co-constructed power generation device according to claim 4, wherein an elastic modulus of the first elastic member is larger than an elastic modulus of the second elastic member.

* * * * *